(12) United States Patent
Tsukio

(10) Patent No.: US 11,486,325 B2
(45) Date of Patent: Nov. 1, 2022

(54) INJECTOR CONTROL UNIT

(71) Applicant: Hitachi Automotive Systems, Ltd., Hitachinaka (JP)

(72) Inventor: Koichi Tsukio, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/266,039

(22) PCT Filed: Jul. 29, 2019

(86) PCT No.: PCT/JP2019/029569
§ 371 (c)(1),
(2) Date: Feb. 4, 2021

(87) PCT Pub. No.: WO2020/054234
PCT Pub. Date: Mar. 19, 2020

(65) Prior Publication Data
US 2021/0310436 A1    Oct. 7, 2021

(30) Foreign Application Priority Data

Sep. 13, 2018   (JP) .............................. JP2018-171084

(51) Int. Cl.
*F02D 41/20* (2006.01)
*F02D 41/06* (2006.01)
*F02D 41/30* (2006.01)

(52) U.S. Cl.
CPC ........... *F02D 41/20* (2013.01); *F02D 41/062* (2013.01); *F02D 41/30* (2013.01); *F02D 2041/2013* (2013.01)

(58) Field of Classification Search
CPC ..... F02D 2041/2013; F02D 2041/2044; F02D 2041/2086; F02D 2041/224; F02D 41/062; F02D 41/20; F02D 41/221; F02D 41/30; F02M 51/00; H02M 1/08
See application file for complete search history.

(56) References Cited

U.S. PATENT DOCUMENTS 4,862,866 A * 9/1989 Calfus .................. H01H 47/043
361/155
2005/0269981 A1* 12/2005 Sakurai ................. B60W 10/08
318/139

(Continued)

FOREIGN PATENT DOCUMENTS

JP       7-103095 A    4/1995
JP    2012-106718 A    6/2012

(Continued)

OTHER PUBLICATIONS

International Search Report (PCT/ISA/210) issued in PCT Application No. PCT/JP2019/029569 dated Nov. 26, 2019 with English translation (five (5) pages).

(Continued)

*Primary Examiner* — Carl C Staubach
(74) *Attorney, Agent, or Firm* — Crowell & Moring LLP

(57) ABSTRACT

Provided is an injector control unit capable of preventing unintended fuel injection other than an engine drive period. The injector control unit includes a cutoff mechanism for cutting off current supply to the injector from at least the ignition OFF to the next ignition ON.

7 Claims, 6 Drawing Sheets

(56) References Cited

U.S. PATENT DOCUMENTS

| | | | |
|---|---|---|---|
| 2009/0192695 A1* | 7/2009 | Machida | F02D 41/221 |
| | | | 701/103 |
| 2015/0188328 A1* | 7/2015 | Abouda | H03K 17/162 |
| | | | 123/478 |
| 2015/0361918 A1* | 12/2015 | Park | F02D 41/20 |
| | | | 123/490 |
| 2017/0138292 A1* | 5/2017 | Schweikert | F02D 41/20 |
| 2017/0310267 A1 | 10/2017 | Fujiwara et al. | |
| 2017/0317583 A1* | 11/2017 | Forghani-Zadeh | H03K 5/08 |
| 2019/0109534 A1* | 4/2019 | Okonogi | F02D 41/3064 |
| 2019/0294134 A1* | 9/2019 | Oyama | B60R 16/02 |
| 2021/0359600 A1* | 11/2021 | Mifune | B60R 16/03 |
| 2022/0034275 A1* | 2/2022 | Tsukio | F02D 41/20 |

FOREIGN PATENT DOCUMENTS

| | | |
|---|---|---|
| JP | 2013-24111 A | 2/2013 |
| JP | 2014-88859 A | 5/2014 |
| JP | 2016-142208 A | 8/2016 |
| JP | 2017-195737 A | 10/2017 |
| JP | 2018-132065 A | 8/2018 |
| WO | WO 2015/104921 A1 | 7/2015 |

OTHER PUBLICATIONS

Japanese-language Written Opinion (PCT/ISA/237) issued in PCT Application No. PCT/JP2019/029569 dated Nov. 26, 2019 (four (4) pages).

* cited by examiner

VALVE OPENING VOLTAGE VH

112: PchFET
113: NPN TRANSISTOR

121: CURRENT CUTOFF MECHANISM CONTROL SIGNAL LINE A
122: CURRENT CUTOFF MECHANISM CONTROL SIGNAL LINE B

INJECTOR CONTROL UNIT

TECHNICAL FIELD

The present invention relates to a fail-safe mechanism in an injector control unit for a fuel injection system.

BACKGROUND ART

As a fail-safe mechanism of a load drive device, for example, in the control device of the AC rotary machine according to PTL 1, there is disclosed a technique in which a SW for blocking a driver control signal from a pre-driver IC is provided between the pre-driver IC and the driver, and the control of an AC rotating machine is stopped by blocking the driver control signal from an arithmetic unit when the arithmetic unit detects an abnormality in the AC rotating machine. Further, in the in-vehicle control device according to PTL 2, there is disclosed a technique in which a current cutoff mechanism is provided upstream of the driver that drives a load, and the energization to the load is stopped by the current cutoff mechanism using the control signal of the arithmetic unit to cut off the current flowing to the driver or stopping the driver control signal from the pre-driver when the arithmetic unit detects an abnormal current to a load.

CITATION LIST

Patent Literature

PTL 1: Japanese Patent Publication No. 2017-195737
PTL 2: Japanese Patent Application No. 2015-556732

SUMMARY OF INVENTION

Technical Problem

However, it is difficult to stop the unintended energization to a load until the arithmetic unit or the pre-driver becomes controllable from before the arithmetic unit or the pre-driver becomes controllable if an abnormality occurs in the driver that controls the load or in the pre-driver that controls the driver. In addition, the energization of the load in the fuel injection system leads to valve opening of the injector, that is, fuel injection, which causes an unintended fuel injection.

An object of the invention is to provide an injector control unit capable of preventing the unintended fuel injection other than the engine drive period.

Solution to Problem

Therefore, an injector control unit according to the invention includes a current cutoff mechanism that cuts off the current to an injector driver on an upstream power source side of an injector circuit, an arithmetic unit for controlling the current cutoff mechanism, and a current cutoff mechanism control signal line for transferring a signal to the current cutoff mechanism for controlling the current cutoff mechanism. The current cutoff mechanism is stopped during an engine drive period to allow the driver to be energized.

Advantageous Effects of Invention

According to the invention, it is possible to prevent an unintended fuel injection due to an abnormality in the injector circuit or the pre-driver circuit during a period in which the injector control unit cannot be controlled before or after the injector control unit is activated or stopped. Objects, configurations, and effects besides the above description will be apparent through the explanation on the following embodiments.

DESCRIPTION OF EMBODIMENTS

Figure 1:
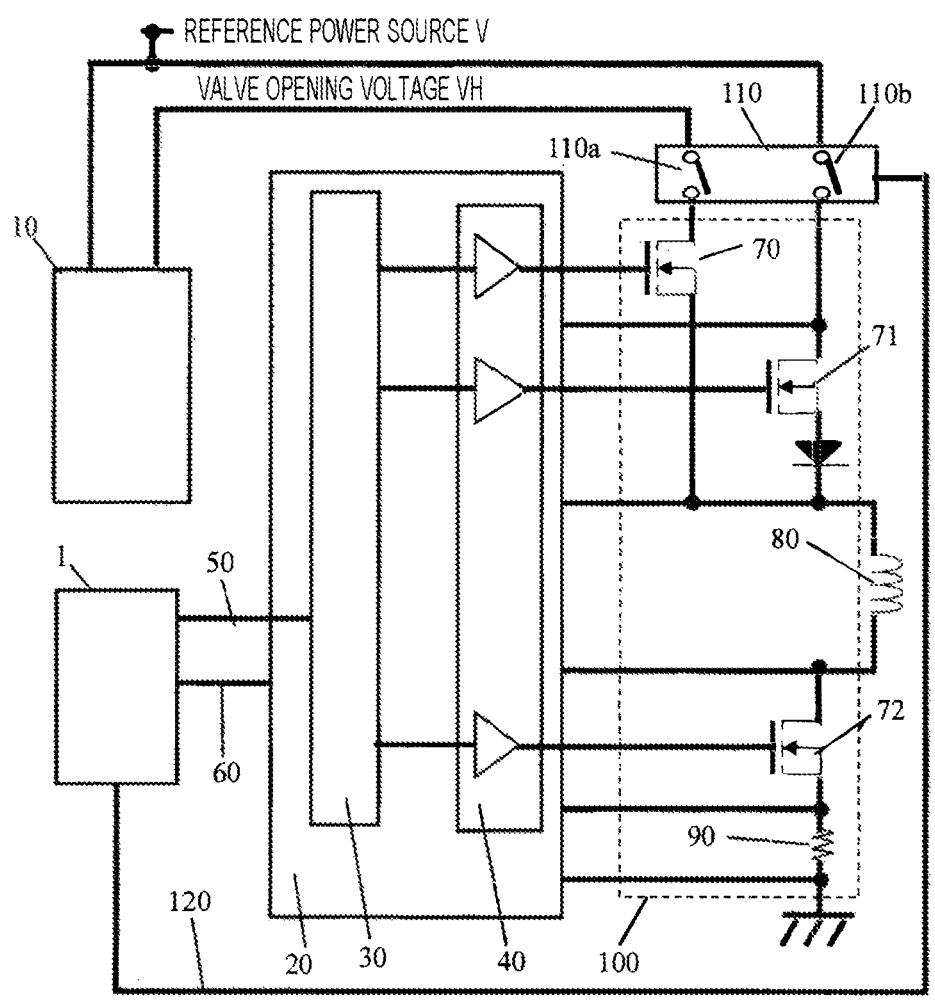
FIG. 1 is a circuit configuration in a first embodiment.

Hereinafter, the first and second embodiments according to the invention will be described with reference to the drawings. Further, the same symbols in the drawings indicate the same portion.

First Embodiment

Figure 2:
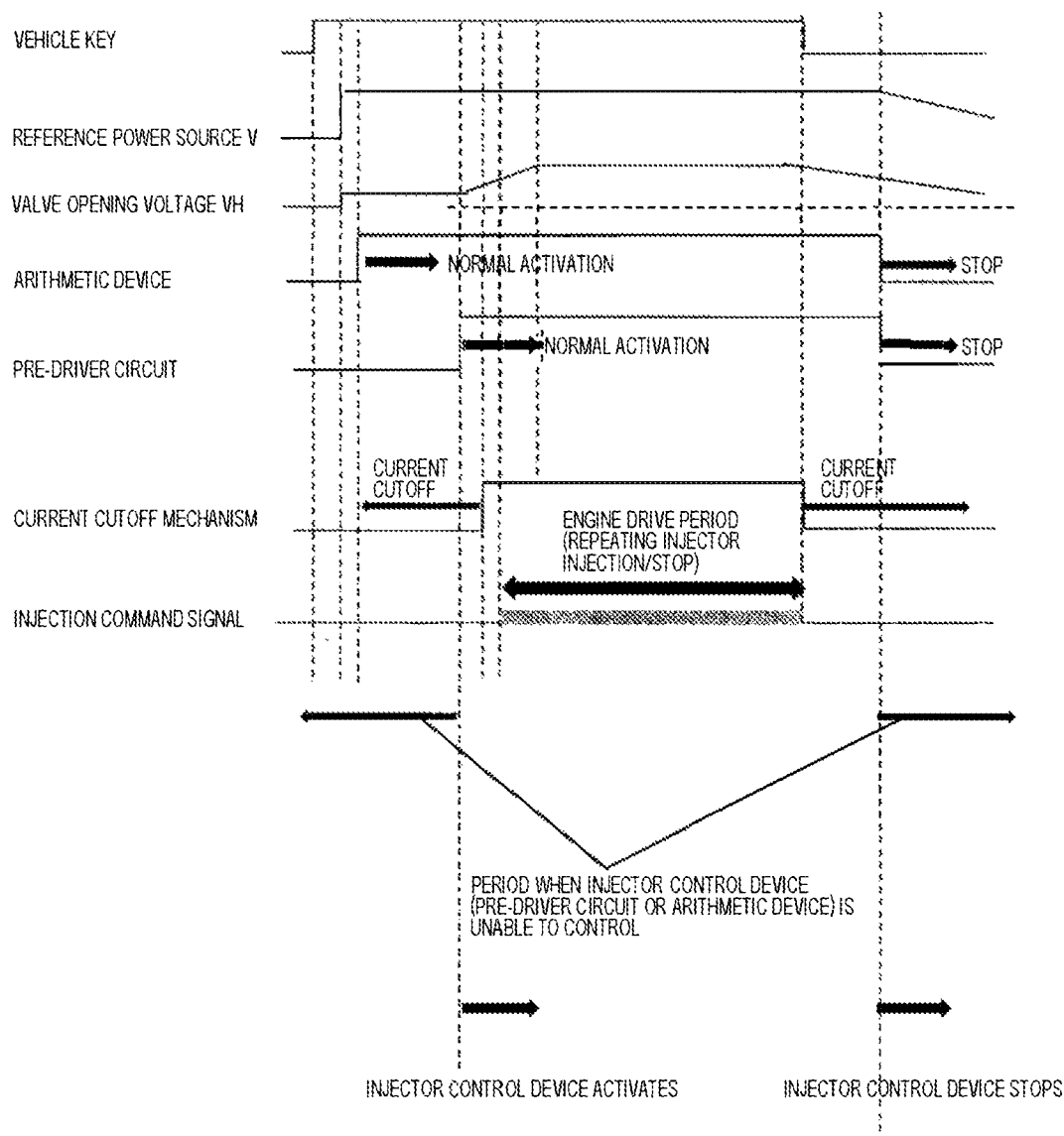
FIG. 2 is a timing chart in the first embodiment.

FIG. 1 is a circuit configuration of an injector control unit according to the first embodiment of the invention, and FIG. 2 is a timing chart when FIG. 1 is implemented. When a reference power source V is turned on to the injector control unit by turning on a vehicle key, an arithmetic unit 1 and a pre-driver circuit 20 can be controlled by the injector control unit after a certain amount of start-up period. During an engine drive period after the injector control unit becomes controllable, when an injection command signal is input from the arithmetic unit 1 to the pre-driver circuit 20, a pre-driver controller that receives the injection command signal controls a pre-driver 40. The control signals output from the pre-driver 40 include an injector valve opening current control signal for an injector valve opening driver 70, an injector valve opening holding current control signal for an injector valve opening holding driver 71, and an injector low side SW signal for an injector low side driver 72. The injector valve opening current control signal referred to here is a signal for controlling the current application for opening the injector, and the injector low side SW control signal is a signal for controlling the low side driver for passing a current to the injector, and the injector valve opening holding current control signal is a signal for controlling the current application for holding the valve open state of the injector for a certain period of time.

A valve opening voltage VH for passing the injector valve opening current is generated in an injector valve opening power source unit 10 and supplied to the injector valve opening driver 70.

Figure 3:
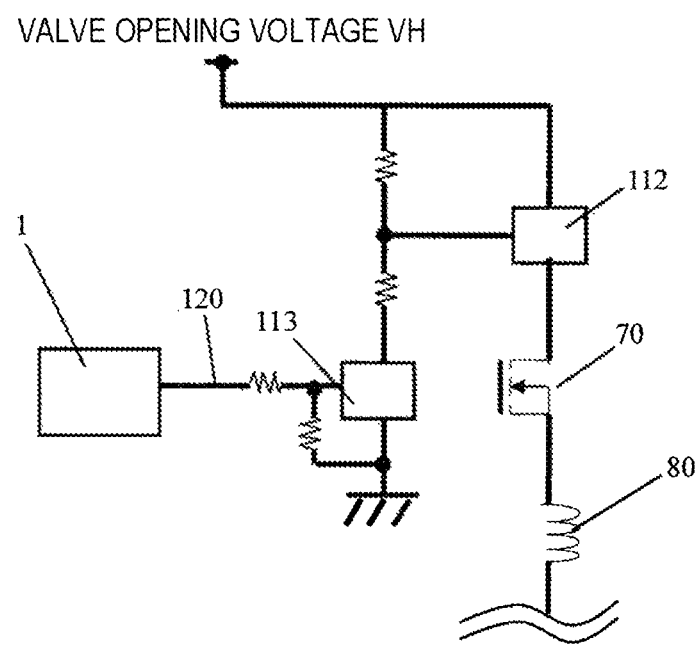
FIG. 3 is a circuit configuration example of a current cutoff mechanism 110.
Figure 4:
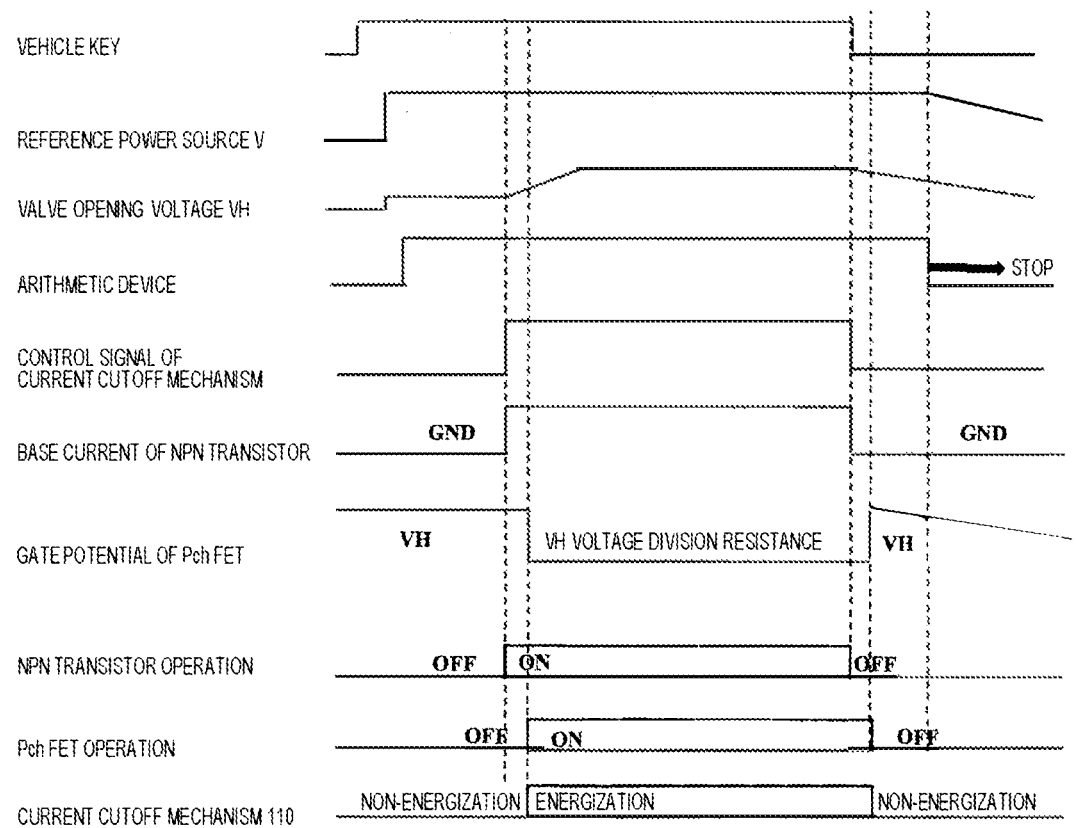
FIG. 4 is a timing chart in the circuit configuration example of the current cutoff mechanism 110.

In this embodiment, the reference power source V is supplied to the injector valve opening power source unit 10, and a booster circuit inside the injector valve opening power source unit 10 generates a valve opening voltage VH for passing the injector valve opening current and is supplied to an injector circuit 30, but it is also conceivable that the VH is supplied with power from a power source prepared in advance. Further, also in the power source to which the current is applied to maintain the valve open state of the injector for a certain period of time, the reference power source V is directly supplied to the injector valve opening holding driver 70 in this embodiment but may be supplied from the injector valve opening power source unit or another power source. Further, the current flowing to the injector in an injector circuit 100 is monitored by an injector current monitor 90, and the current of the injector is controlled based on the current detected by the injector current monitor 90. In this embodiment, the injector circuit 100 is driven by monitoring the above-mentioned valve opening current control signal, injector low side SW control signal, injector valve opening holding current control signal, and current flowing through the injector. The current cutoff mechanism 110 is connected to the arithmetic unit 1 by a current cutoff mechanism control signal line 120, and the arithmetic unit 1 can control energization and de-energization of the downstream driver of the current cutoff mechanism 110. Further, the current cutoff mechanism 110 is a mechanism for de-energizing the injector valve opening driver 70 and the injector valve opening holding driver 71 always when a current cutoff control signal is not output from the arithmetic unit 1 or when a control signal for non-energization is output intentionally. In this embodiment, the current cutoff mechanism 110 is provided on the upstream side of the injector valve opening driver 70 and the injector valve opening holding driver 71, but may be provided on the downstream side of the injector low side driver 72. FIG. 3 is an example of the internal configuration of the current cutoff mechanism 110, and FIG. 4 is a timing chart illustrating the operation of FIG. 3. Although this internal configuration example is illustrated on behalf of a current cutoff SW 110a, the same configuration can be considered for a current cutoff SW 110b. Since the gate and source of a Pch FET 112, which is a component of the current cutoff SW 110a, are connected via a resistor, the Pch FET 112 is de-energized if the arithmetic unit 1 controls the current cutoff mechanism 110 via the current cutoff mechanism control signal line 120. In this internal configuration example, the gate and source of the Pch FET 112 are connected via a resistor, but for the purpose of protecting the Pch FET 112, it is conceivable to provide a protection element in parallel with the resistor. When a current cutoff mechanism control signal is output from the arithmetic unit 1, a current is injected into the base of an NPN transistor 113, and the emitter and collector of the NPN transistor 113 are energized. Due to the continuation, the gate voltage of the Pch FET 112 becomes lower than the source voltage, so that the Pch FET 112 is also energized. On the other hand, when the output of the current cutoff mechanism control signal is stopped, the current injection into the base of the NPN transistor 113 is also stopped, so that the NPN transistor 113 is de-energized. The gate-source potential of the Pch FET 112 becomes the same potential, so that Pch FET 112 is de-energized. This configuration is an example of the configuration that the current cutoff mechanism maintains the non-energized state in a case where the current cutoff mechanism 110 can be controlled to be energized and de-energized by the arithmetic unit 1, and the arithmetic unit 1 does not intentionally control.

In this embodiment, the arithmetic unit 1 switches the current cutoff mechanism 110 from the non-energized state to the energized state before the injector control unit is activated and the engine drive period is entered by completing the normal start of the arithmetic unit 1 and the pre-driver circuit 20. Alternatively, by switching the current cutoff mechanism 110 from the energized state to the non-energized state by the arithmetic unit 1 after the engine drive period, it is possible to cut off the current flowing into the injector circuit 100 during a period when the injector control unit is not able to control before the injector control unit is activated or after stopped. Therefore, it is possible to prevent an unintended fuel injection due to an abnormality in the injector circuit or the pre-driver circuit during a period when the injector control unit is not able to control.

Second Embodiment

Figure 5:
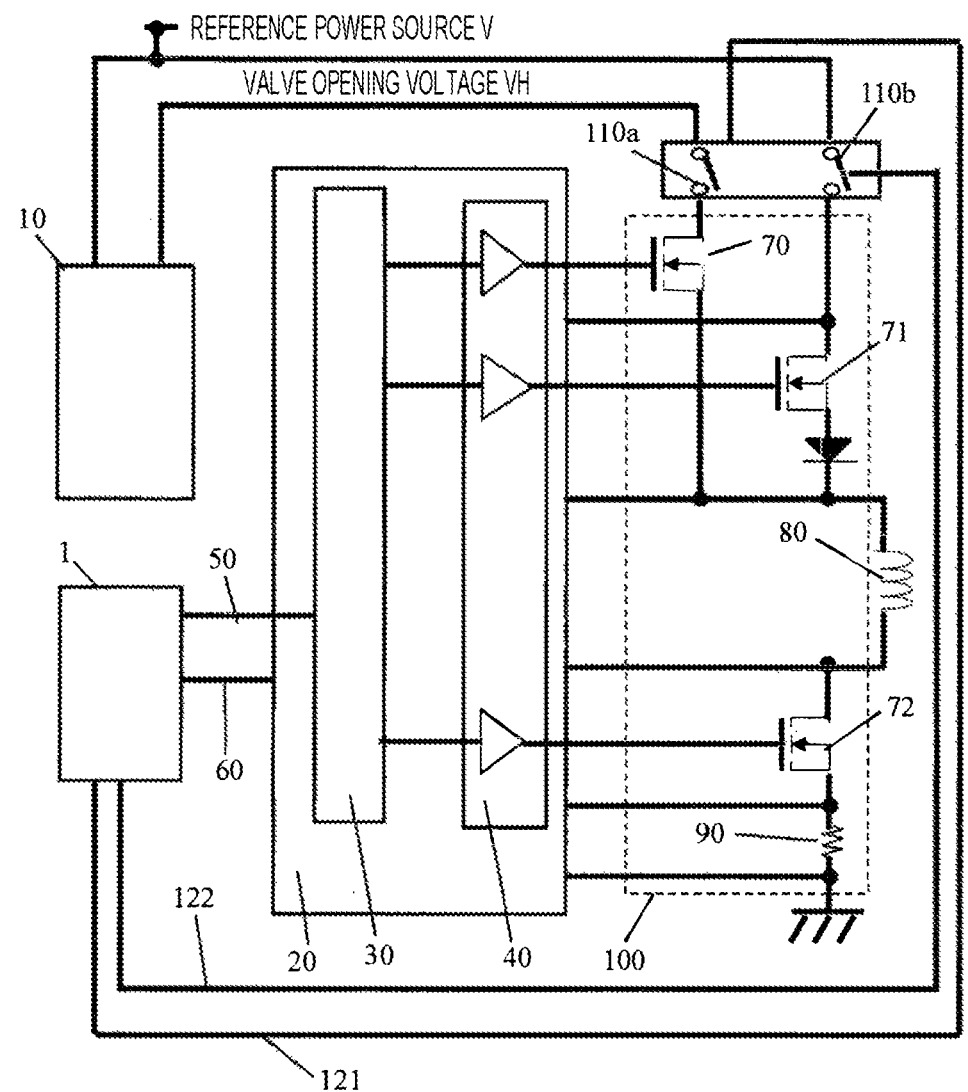
FIG. 5 is a circuit configuration in a second embodiment.
Figure 6:
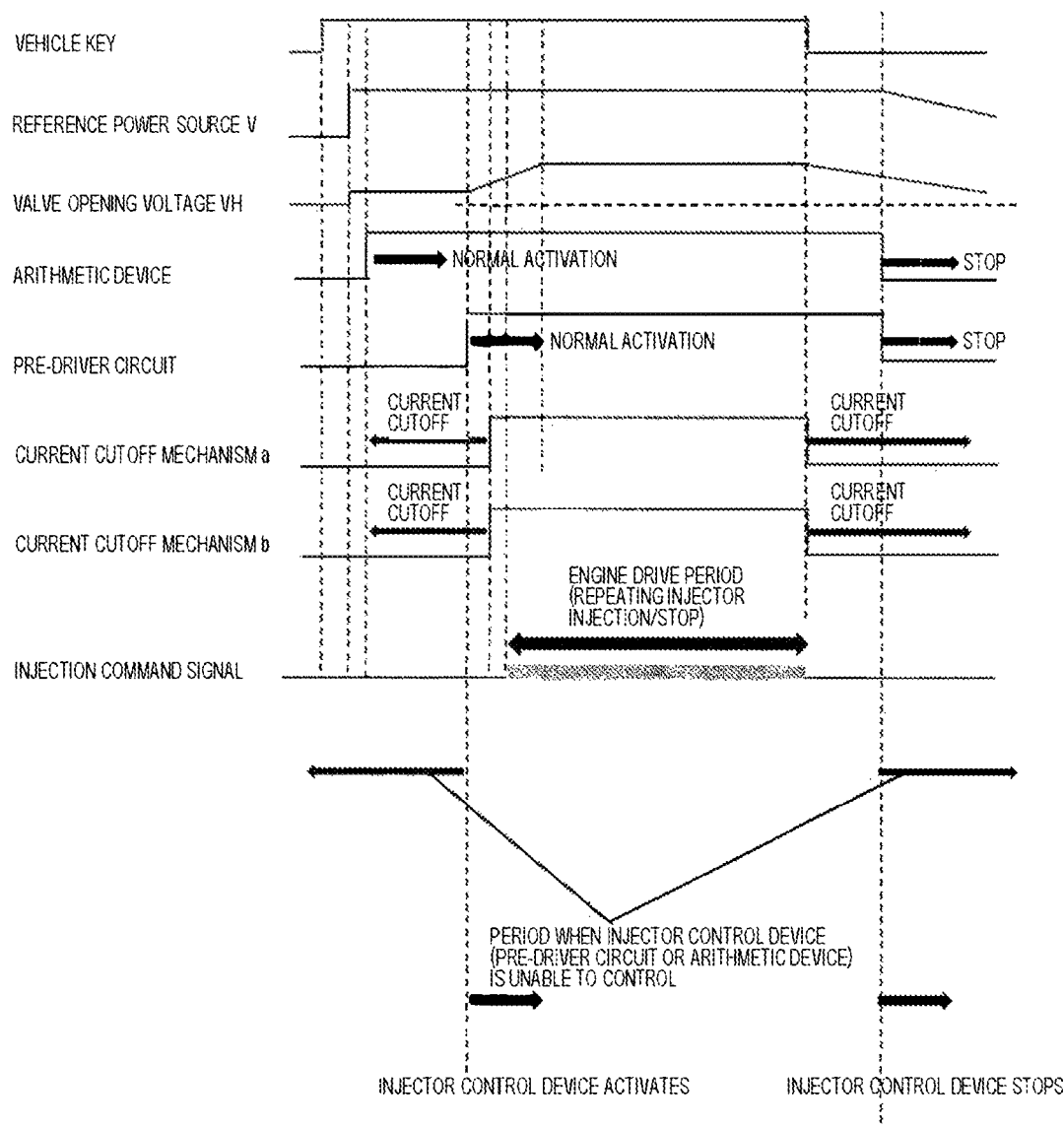
FIG. 6 is a timing chart in the second embodiment.

FIG. 5 is a circuit configuration according to a second embodiment of the invention, and FIG. 6 is a timing chart when FIG. 5 is implemented. The circuit configuration is such that the current cutoff mechanism control signal line 120 illustrated in FIG. 1 described above is changed to a current cutoff mechanism control signal line A121 and a current cutoff mechanism control signal line B122.

The current cutoff mechanism control signal line A121 can independently control the current cutoff mechanism 110a for the injector valve opening driver 70, and the current cutoff mechanism control signal line B122 can control the current cutoff mechanism 110b for the injector valve opening holding driver 71. In a case where an abnormality of the injector circuit or the pre-driver circuit during a period when the injector control unit is not able to control before the injector control unit is activated or after stopped occurs in any one of the path of the injector valve opening driver 70, the path of the injector valve opening holding driver 71, it is conceivable that the engine can be driven by operating only a normal path in order for the user to move the failed vehicle to a safe place for example.

In this embodiment, in addition to the first embodiment described above, a current cutoff mechanism control signal line for independently controlling the injector valve opening driver 70 side and the injector valve opening holding driver 71 side of the current cutoff mechanism is provided, so that it is possible to prevent the engine from being unable to start when only one of the paths in the injector circuit 100 is abnormal.

REFERENCE SIGNS LIST 1 arithmetic unit
10 injector valve opening power source unit
20 pre-driver circuit
30 pre-driver controller
40 pre-driver
50 injection command signal line
60 pre-driver stopping reset signal line
70 injector valve opening driver
71 injector valve opening holding driver
72 injector low side driver
80 injector
90 injector current monitor
100 injector circuit
110 current cutoff mechanism
110a,110b current cutoff SW
112 PchFET
113 NPN transistor
120 current cutoff mechanism control signal line
121 current cutoff mechanism control signal line
A122 current cutoff mechanism control signal line B

The invention claimed is:
1. An injector control unit comprising:
a driver configured to drive an injector;
a pre-driver configured to transmit a drive command to the driver;
an arithmetic unit configured to transmit a control command to the pre-driver; and, a cutoff mechanism configured to:
  cut off current supply to the injector,
  when ignition is ON, start current supply to the injector after the arithmetic unit and the pre-driver are each normally started,
  when ignition is OFF, cut off current supply to the injector before operation of the arithmetic unit or the pre-driver is stopped,
  the driver includes a first driver connected to a battery voltage and a second driver connected to a boosted voltage, and the cutoff mechanism cuts off both a current from the first driver and a current from the second driver, and
  the cutoff mechanism controls cutting off the current from the first driver and the current from the second driver at independent timings.

2. The injector control unit according to claim 1, wherein the cutoff mechanism cuts off the current supply to the injector from the ignition ON to a predetermined period.

3. The injector control unit according to claim 1, wherein the cutoff mechanism cuts off the current supply to the injector until before cranking.

4. The injector control unit according to claim 1, wherein the cutoff mechanism receives a control command directly from the arithmetic unit.

5. An injector control unit comprising:
a driver configured to drive an injector;
a pre-driver configured to transmit a drive command to the driver;
an arithmetic unit configured to transmit a control command to the pre-driver; and
a cutoff mechanism configured to cut off current supply to the injector from at least an ignition OFF to a next ignition ON, wherein
  the driver includes a first driver connected to a battery voltage and a second driver connected to a boosted voltage, and the cutoff mechanism cuts off both a current from the first driver and a current from the second driver, and
  the cutoff mechanism controls cutting off the current from the first driver and the current from the second driver at independent timings.

6. The injector control unit according to claim 1, wherein the cutoff mechanism cuts off a current flowing through the injector.

7. The injector control unit according to claim 1, wherein the cutoff mechanism maintains a current cutoff state when there is no control command from the arithmetic unit.

* * * * *